(12) United States Patent
Whitney et al.

(10) Patent No.: US 10,167,746 B2
(45) Date of Patent: Jan. 1, 2019

(54) METHOD OF CONTROLLING CAMSHAFT PHASE BASED ON HUMIDITY

(71) Applicant: GM Global Technology Operations LLC, Detroit, MI (US)

(72) Inventors: Christopher E. Whitney, Commerce, MI (US); David N. Hayden, Ortonville, MI (US); Nicola Pisu, Canton, MI (US); Stephen P. Levijoki, Swartz Creek, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 167 days.

(21) Appl. No.: 15/429,219

(22) Filed: Feb. 10, 2017

(65) Prior Publication Data

US 2018/0230864 A1    Aug. 16, 2018

(51) Int. Cl.
| | | |
|---|---|---|
| *F02D 13/02* | (2006.01) | |
| *F01L 1/344* | (2006.01) | |
| *F01L 1/047* | (2006.01) | |
| *F02D 41/02* | (2006.01) | |
| *F02D 41/04* | (2006.01) | |
| *F01L 13/00* | (2006.01) | |
| *F01L 1/46* | (2006.01) | |

(52) U.S. Cl.
CPC .......... *F01L 1/344* (2013.01); *F01L 1/047* (2013.01); *F02D 41/021* (2013.01); *F02D 41/04* (2013.01); *F01L 1/46* (2013.01); *F01L 2013/116* (2013.01); *F01L 2201/00* (2013.01); *F01L 2800/05* (2013.01); *F01L 2820/044* (2013.01); *F02D 13/0219* (2013.01); *F02D 13/0261* (2013.01); *F02D 2200/021* (2013.01); *F02D 2200/0402* (2013.01); *F02D 2200/0418* (2013.01); *F02D 2200/101* (2013.01); *F02D 2200/1002* (2013.01); *F02D 2200/602* (2013.01); *F02D 2200/70* (2013.01)

(58) Field of Classification Search
CPC ..... F01L 2001/0537; F01L 1/344; F01L 1/46; F01L 2013/116; F01L 2201/00; F01L 2800/05; F01L 2820/044; F02D 13/0219; F02D 13/0261; F02D 2200/021; F02D 2200/0402; F02D 2200/0418; F02D 2200/1002; F02D 2200/101; F02D 2200/602
USPC ............................................ 123/90.15, 90.17
See application file for complete search history.

(56) References Cited

U.S. PATENT DOCUMENTS

2007/0095328 A1* 5/2007 Brehob ................. F02D 41/005
123/406.47

* cited by examiner

*Primary Examiner* — Jorge Leon, Jr.

(57) ABSTRACT

A method of phasing the opening and closing of internal combustion engine intake and exhaust valves relative to the rotation of the crankshaft is based upon changes in engine speed, engine load and ambient relative humidity. During certain conditions of higher humidity, in order to maintain good combustion stability and thus overall engine operation, it is necessary to reduce intake and exhaust valve overlap by adjusting the phase of the intake and exhaust camshafts. This is achieved by utilizing a set of cam position reference values and constraints based upon engine speed, engine load and humidity that are contained in lookup tables that adjust and limit cam position and valve overlap. Generally speaking, in order to maintain optimum engine performance, intake and exhaust valve overlap is reduced with higher ambient humidity and vice versa.

16 Claims, 5 Drawing Sheets

METHOD OF CONTROLLING CAMSHAFT PHASE BASED ON HUMIDITY

INTRODUCTION

The present disclosure relates to cam shaft phase control and more particularly to a method of controlling intake and exhaust camshaft phase in an internal combustion engine based upon ambient humidity.

The statements in this section merely provide background information related to the present disclosure and may or may not constitute prior art.

For decades, internal combustion engines, especially those utilized in passenger cars and light trucks, utilized fixed valve timing. In such engines, regardless of speed, load, fuel mixture, spark timing or other operating parameters, the intake and exhaust valves opened and closed at the same times relative to rotation of the crankshaft and positions of the pistons. This was done in spite of the fact that fixed valve timing was increasingly acknowledged to be a compromise, generally between low speed and high speed operation.

In response to this acknowledgement, variable valve timing or phasing of the intake and exhaust valves of an internal combustion engine came to be relied upon by engine designers and manufacturers as a control method which provides improved engine performance including enhanced power and torque, increased fuel efficiency and reduced emissions. Depending upon engineering goals and other criteria, variable valve phasing may include the phasing of the opening and closing of the intake valve, opening and closing of the exhaust valve, lift of the intake and exhaust valves, and combinations thereof.

When the decision is made to incorporate variable valve phasing in a particular internal combustion engine configuration, not only are the foregoing aspects of valve phasing addressed but also the engine operating parameters are addressed to provide the control parameters for such valve phasing. Typical operating parameters that are monitored in real time to provide control inputs to the valve phasing control system are engine speed, engine load, throttle position and air flow.

As performance, fuel efficiency and emissions standards become ever more demanding, significant effort has been directed to continued development of variable valve phasing systems and the following disclosure is a result of such effort.

SUMMARY

The present invention provides a method of phasing the opening and closing of internal combustion engine intake and exhaust valves relative to the rotation of the crankshaft based upon changes in ambient relative humidity. During certain conditions of higher humidity, in order to maintain good combustion stability and thus overall engine operation, it is necessary to reduce intake and exhaust valve overlap by adjusting the phase of the intake and exhaust camshafts. This is achieved by utilizing a set of cam position reference values and constraints based upon engine speed, engine load and humidity that are contained in lookup tables that adjust and limit cam position and valve overlap. Generally speaking, in order to maintain optimum engine performance, intake and exhaust valve overlap is reduced with higher ambient humidity and vice versa. These cam position constraints can be tuned to optimize engine performance, maintain combustion stability or maximize other operational goals. If the sensed ambient humidity is below a predetermined humidity threshold, such that no intake and exhaust cam position constraints are required, no such constraints will be imposed.

Thus it is an aspect of the present disclosure to provide a method of controlling an internal combustion engine which optimizes performance under conditions of varying ambient humidity.

It is a further aspect of the present disclosure to provide a method of controlling the opening and closing of intake and exhaust valves of an internal combustion engine to optimize performance under conditions of varying ambient humidity.

It is a still further aspect of the present disclosure to provide a method of adjusting the opening and closing of intake and exhaust valves relative to the position of a crankshaft of an internal combustion engine to optimize performance under conditions of varying ambient humidity.

It is a still further aspect of the present disclosure to provide a method of adjusting the overlap between the opening of an intake valve and the closing of an exhaust valve of an internal combustion engine to optimize performance under conditions of varying ambient humidity.

It is a still further aspect of the present disclosure to provide a method of utilizing lookup tables to adjust the opening and closing of intake and exhaust valves relative to the position of a crankshaft of an internal combustion engine to optimize performance under conditions of varying ambient humidity.

It is a still further aspect of the present disclosure to provide a method of utilizing lookup tables to adjust the phase of intake and exhaust camshafts relative to the position of a crankshaft to control the opening and closing of intake and exhaust valves of an internal combustion engine to optimize performance under conditions of varying ambient humidity.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
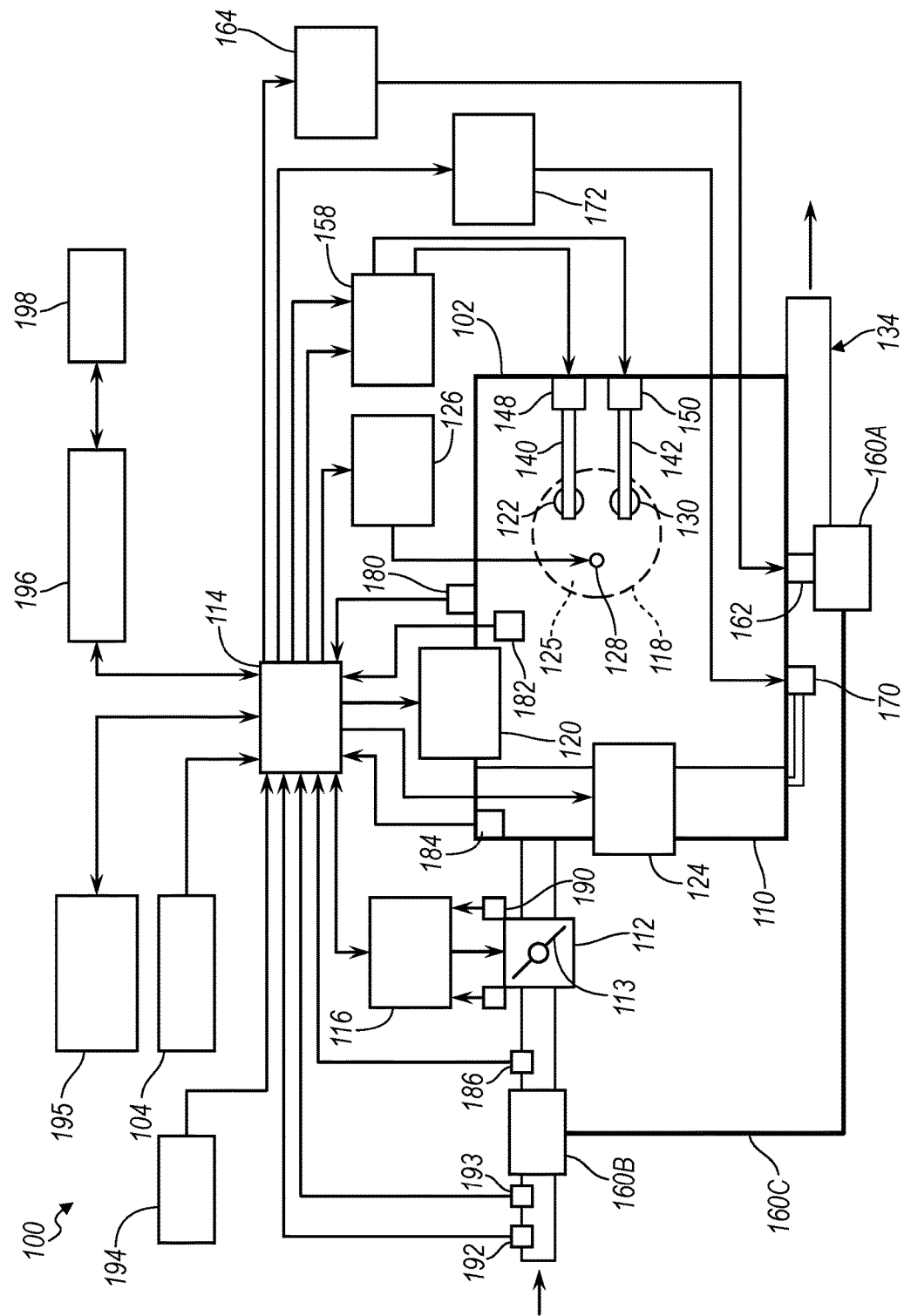
FIG. 1 is a functional block diagram of an exemplary internal combustion engine system according to the present disclosure.

Referring now to FIG. 1, a functional block diagram of an exemplary internal combustion engine system 100 is presented. The engine system 100 includes a spark ignition internal combustion engine 102 that combusts an air/fuel mixture to produce drive torque for a vehicle (not illustrated) based on driver input from a driver input module 104.

The internal combustion engine includes an intake manifold 110 into which air is drawn through a throttle valve 112. The throttle valve 112 typically includes moveable throttle plate 113. An engine control module (ECM) 114, which will be described in greater detail below, controls a throttle actuator module 116, which regulates opening of the throttle plate 113 within the throttle valve 112 to control the amount of air drawn into the intake manifold 110.

Air from the intake manifold 110 is drawn into a plurality of cylinders 118 of the engine 102, one of which is illustrated in FIG. 1. The engine 102 may include 3, 4, 5, 6, 8, 10 or 12 cylinders. The ECM 114 may instruct a cylinder actuator module 120 to selectively deactivate some of the cylinders, which may improve fuel economy under certain engine operating conditions.

The engine 102 operates using a four-stroke cycle. The four strokes are referred to as the intake stroke, the compression stroke, the combustion stroke, and the exhaust stroke. During each revolution of a crankshaft (not illustrated), two of the four strokes occur within the cylinder 118. Therefore, two crankshaft revolutions are necessary for the cylinder 118 to complete a full, four stroke combustion cycle.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. Alternatively, fuel may be injected directly into the cylinders or into mixing chambers associated with the cylinders. The fuel actuator module 124 terminates injection of fuel to cylinders that are deactivated.

The injected fuel mixes with air and creates an air/fuel mixture in the cylinder 118. During the compression stroke, a piston 125 within the cylinder 118 compresses the air/fuel mixture. A spark actuator module 126 energizes a spark plug 128 in the cylinder 118 based on a signal from the ECM 114, which ignites the air/fuel mixture.

The spark actuator module 126 is controlled by a timing signal specifying how far before or after the top dead center (TDC) position of the piston 125 to generate the spark. Because piston position is directly related to crankshaft rotation, operation of the spark actuator module 126 is preferably synchronized with crankshaft angle. The spark actuator module 126 has the ability to constantly vary the timing signal for the spark relative to top dead center of the piston 125. The spark actuator module 126 may halt provision of spark to deactivated cylinders.

During the combustion stroke, the combustion of the air/fuel mixture drives the piston 125 away from TDC, thereby driving the crankshaft. The combustion stroke may be defined as the time between the piston 125 reaching TDC and the time at which the piston reaches bottom dead center (BDC). During the exhaust stroke, the piston 125 begins moving away from BDC and expels the products of combustion through an exhaust valve 130. The products of combustion are exhausted from the vehicle through an exhaust system 134.

The intake valve 122 is controlled by an intake camshaft 140, while the exhaust valve 130 is controlled by an exhaust camshaft 142. It should be understood that the intake camshaft 140 or multiple intake camshafts 140 will typically control a plurality of intake valves 122 associated with one or more cylinders 118 in one or more cylinder banks. Likewise, it should be understood that the exhaust camshaft 142 or multiple exhaust camshafts 142 will typically control a plurality of exhaust valves 130 associated with one or more cylinders 118 in one or more cylinder banks. It should also be understood that the intake valve 122 and/or the exhaust valve 130 may be controlled by devices other than camshafts, such as cam less valve actuators. The cylinder actuator module 120 may deactivate the cylinder 118 by disabling opening of the intake valve 122 and/or the exhaust valve 130.

The time when the intake valve 122 is opened and closed with respect to piston TDC is varied by an intake cam phaser 148. Correspondingly, the time when the exhaust valve 130 is opened and closed with respect to piston TDC is varied by an exhaust cam phaser 150. A phaser actuator module 158 controls the intake cam phaser 148 and the exhaust cam phaser 150 based on signals from the ECM 114. Optionally, variable valve lift may also be controlled by the phaser actuator module 158.

The engine system 100 may include a turbocharger that includes a turbine 160A powered by hot exhaust gases flowing through the exhaust system 134. The turbocharger also includes an air compressor 160B that is driven by the turbine 160A. The compressor 160B compresses air leading into the throttle valve 112. The turbine 160A and the compressor 160B are coupled by a rotating member such as a shaft 160C. Although shown separated for purposes of clarity, the turbine 160A and the compressor 160B may be adjacent and attached to each other. Alternatively, a supercharger (not illustrated), driven by the engine crankshaft, compresses air from the throttle valve 112 and delivers it to the intake manifold 110.

A waste gate 162, disposed in parallel with the turbine 160A of the turbocharger, allows exhaust to bypass the turbine 160A, thereby reducing the boost, i.e., the amount of intake air compression, provided by the turbocharger. A boost actuator module 164 controls the boost of the turbocharger by controlling opening of the waste gate 162. It should be understood that two or more turbochargers and waste gates 162 may be utilized and controlled by the boost actuator module 164.

Optionally, an air cooler (not illustrated) may be disposed before the intake manifold 110 to transfer heat from the compressed air charge to a cooling medium, such as engine coolant or ambient air. Alternatively, the compressed air charge may receive heat, for example, from compression or from components of the exhaust system 134.

The engine system 100 includes an exhaust gas recirculation (EGR) valve 170, which selectively redirects exhaust gas back to the intake manifold 110. The EGR valve 170 may be located upstream of the turbocharger's turbine 160A. The EGR valve 170 is controlled by an EGR actuator module 172 based on signals from the ECM 114.

The position of the crankshaft is measured using a crankshaft position sensor 180. The rotational speed of the crankshaft, which is also the rotational speed of the engine 102, may be determined based on the crankshaft position. The temperature of the engine coolant is measured by an engine coolant temperature (ECT) sensor 182. The ECT sensor 182 is preferably located within the engine 102 or at another location where the coolant is circulated, such as a radiator (not illustrated).

The pressure within the intake manifold 110 is measured using a manifold absolute pressure (MAP) sensor 184. Optionally, engine vacuum, which is the difference between ambient air pressure and the pressure within the intake manifold 110, may be measured. The mass flow rate of air flowing into the intake manifold 110 is measured using a mass air flow (MAF) sensor 186.

The throttle actuator module 116 monitors the real time position of the throttle valve 112 using one or more throttle position sensors (TPS) 190. The ambient temperature of air being drawn into the engine 102 is measured by an intake air temperature (IAT) sensor 192. The ambient humidity of air being drawn into the engine 102 is measured by an intake air humidity (IAH) sensor 193. The engine system 100 may also include additional sensors 194, such as one or more knock sensors, a compressor outlet pressure sensor, a throttle inlet pressure sensor, a waste gate position sensor, an EGR position sensor, as well as other suitable sensors. The signals (outputs) from all such sensors are provided to the ECM 114 to make control decisions for the engine system 100.

The ECM 114 communicates with a transmission control module 195 to coordinate shifting gears in a transmission (not illustrated). For example, the ECM 114 may reduce engine torque during a gear shift. The ECM 114 communicates with a hybrid control module 196 to coordinate operation of the engine 102 with an electric motor 198. The electric motor 198 typically also functions as a generator and may be used to produce electrical energy for use by vehicle electrical systems or for storage in a battery.

Each system that varies an engine parameter is referred to as an engine actuator. For example, the throttle actuator module 116 adjusts the opening of the throttle valve 112 to achieve a target throttle opening area. The spark actuator module 126 controls spark timing to achieve a target spark timing relative to piston TDC. The fuel actuator module 124 controls the fuel injectors to achieve target fueling parameters. The phaser actuator module 158 controls the intake and exhaust cam phasers 148 and 150 to achieve target intake and exhaust cam phase angles, respectively. The EGR actuator module 172 controls the EGR valve 170 to achieve a target EGR opening area. The boost actuator module 164 controls the waste gate 162 to achieve a target waste gate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed in detail below.

Figure 2:
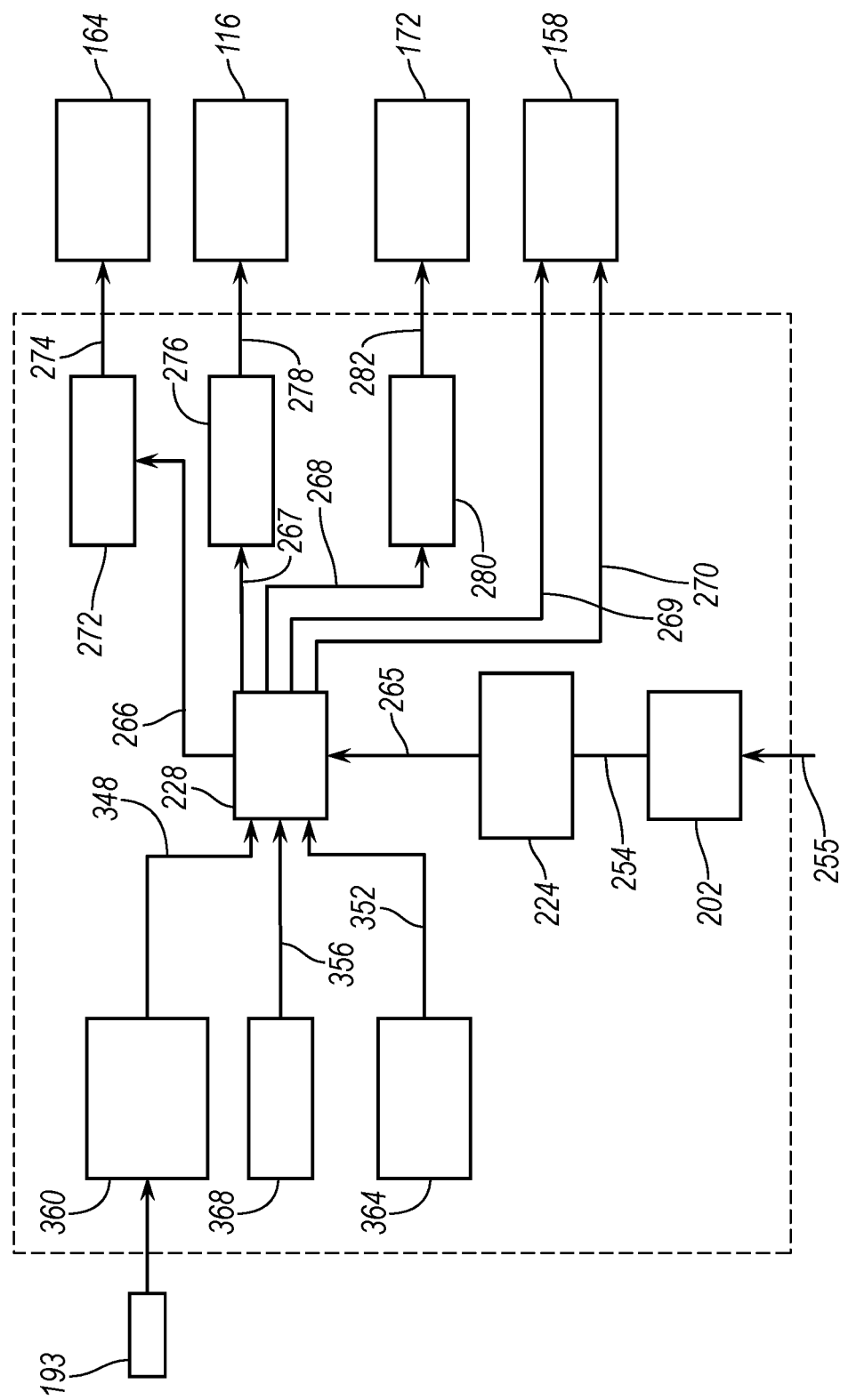
FIG. 2 is a functional block diagram of an exemplary internal combustion engine control module (ECM) according to the present disclosure.

Referring now to FIG. 2, a functional block diagram of the engine control module (ECM) 114 is presented. The ECM 114 includes a driver torque module 202, a torque requesting module 224 and an air control module 228.

The driver torque module 202 determines a driver torque request 254 based on a driver input 255 from the driver input module 104 illustrated in FIG. 1. The driver input 255 is based on, for example, the position of an accelerator pedal and the position of a brake pedal. The driver input 255 may also be based on a cruise control setting, or an adaptive cruise control system that varies vehicle speed to maintain a predetermined following distance.

The torque requesting module 224 determines an air torque request 265 based on the drive torque request 254. The air torque request 265 may be a brake torque.

Target values for airflow controlling engine actuators are determined based on the air torque request 265. More specifically, based on the air torque request 265, the air control module 228 determines a target waste gate opening area 266, a target throttle opening area 267, a target EGR opening area 268, a target intake cam phaser angle 269, and a target exhaust cam phaser angle 270 using model predictive control, as discussed in detail below.

The boost actuator module 164 controls the waste gate 162 to achieve the target waste gate opening area 266. For example, a first conversion module 272 converts the target waste gate opening area 266 into a target duty cycle 274 to be applied to the waste gate 162, and the boost actuator module 164 applies a signal to the waste gate 162 based on the target duty cycle 274. Alternatively, the first conversion module 272 converts the target waste gate opening area 266 into a target waste gate position, and converts the target waste gate position into the target duty cycle 274.

The throttle actuator module 116 controls the throttle valve 112 to achieve the target throttle opening area 267. For example, a second conversion module 276 converts the target throttle opening area 267 into a target duty cycle 278 to be applied to the throttle valve 112, and the throttle actuator module 116 applies a signal to the throttle valve 112 based on the target duty cycle 278. Alternatively, the second conversion module 276 converts the target throttle opening area 267 into a target throttle position, and converts the target throttle position into the target duty cycle 278.

The EGR actuator module 172 controls the EGR valve 170 to achieve the target EGR opening area 268. For example, a third conversion module 280 converts the target EGR opening area 268 into a target duty cycle 282 to be applied to the EGR valve 170, and the EGR actuator module 172 applies a signal to the EGR valve 170 based on the target duty cycle 282. Alternatively, the third conversion module 280 converts the target EGR opening area 268 into a target EGR position, and converts the target EGR position into the target duty cycle 282.

The phaser actuator module 158 controls both the intake cam phaser 148 to achieve the target intake cam phase angle 269 and the exhaust cam phaser 150 to achieve the target exhaust cam phase angle 270. Alternatively, a fourth conversion module (not illustrated) may be included to convert the target intake and exhaust cam phase angles into target intake and exhaust duty cycles which are applied to the intake and exhaust cam phasers 148 and 150, respectively. The air control module 228 may also determine a target overlap factor and a target effective displacement and the phaser actuator module 158 may control the intake and exhaust cam phasers 148 and 150 to achieve the target overlap factor and the target effective displacement.

Figure 3:
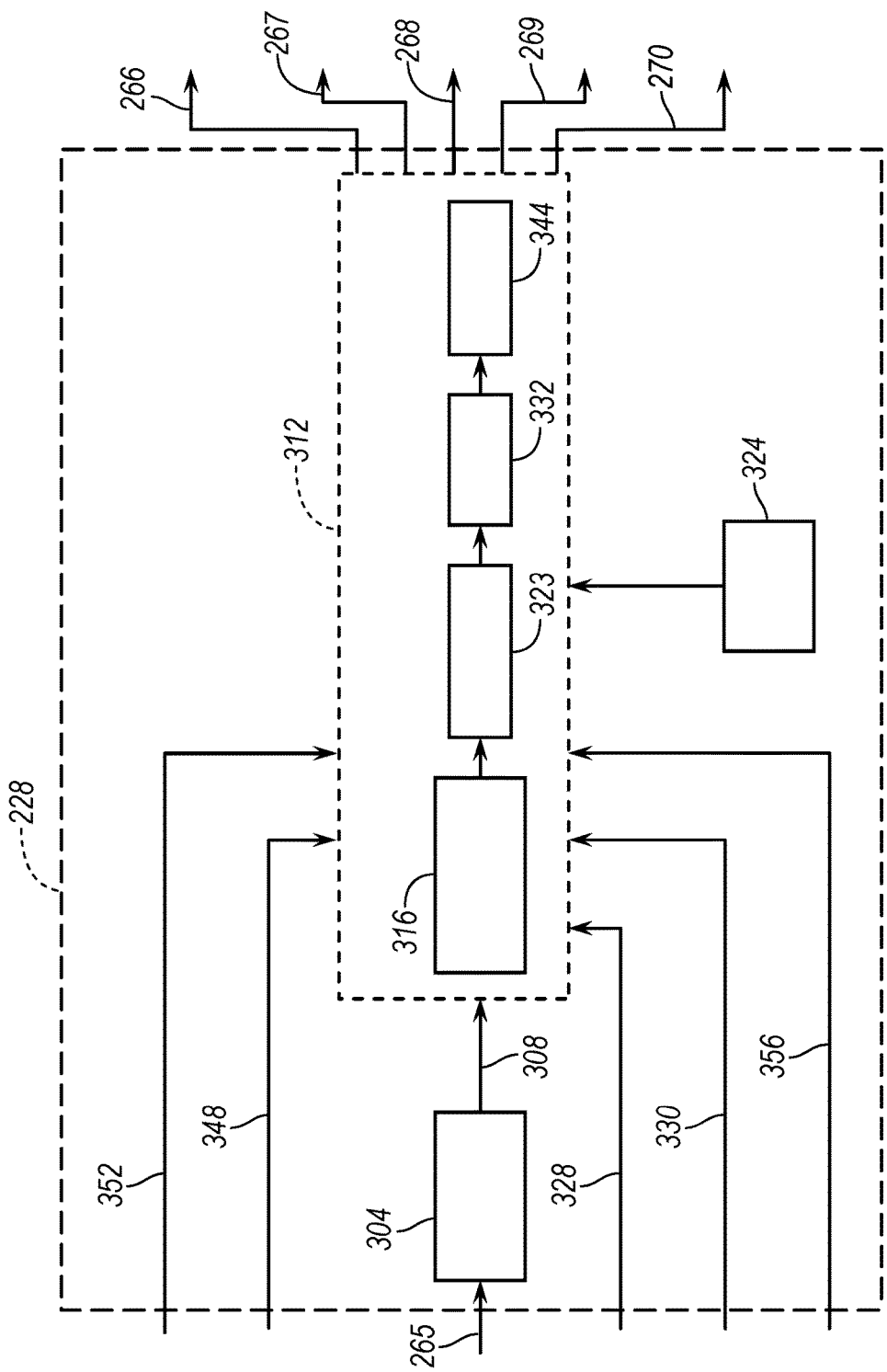
FIG. 3 is a functional block diagram of an example air control module for an internal combustion engine according to the present disclosure.

Referring now to FIGS. 2 and 3, the air control module 228 includes a torque conversion module 304 which receives the air torque request 265 which, as discussed above, may be a brake torque. The torque conversion module 304 converts the air torque request 265 into base torque. Base torque refers to torque at the crankshaft generated during operation of the engine 102 on a dynamometer while the engine 102 is at operating temperature and no torque loads are imposed on the engine 102 by accessories, such as an alternator or an air conditioning compressor. The torque conversion module 304 converts the air torque request 265 into a base air torque request 308, for example, using a mapping or a function that relates brake torques to base torques. The torque request resulting from conversion into base torque will be referred to as a base air torque request 308.

A model predictive control (MPC) module 312 generates five target values 266 through 270 using a model predictive control scheme. The five target values are: waste gate target value 266, throttle target value 267, EGR target value 268, intake cam phaser angle target value 269 and exhaust cam phaser angle target value 270. A sequence determination module 316 determines possible sequences of the target values 266 through 270 that could be used together during N future control loops.

A prediction module 323 determines predicted responses of the engine 102 to the possible sequences of the target values 266 through 270, respectively, based on a mathematical model 324 of the engine 102, ancillary inputs 328, and feedback inputs 330. More specifically, based on a possible sequence of the target values 266 through 270, the ancillary inputs 328, and the feedback inputs 330, using the model 324, the prediction module 323 generates a sequence of predicted torques of the engine 102 for the N control loops, a sequence of predicted air per cylinder 118 (APCs) for the N control loops, a sequence of predicted amounts of external dilution for the N control loops, a sequence of predicted amounts of residual dilution for the N control loops, a sequence of predicted combustion phasing values for the N control loops, and a sequence of predicted combustion quality values for the N control loops.

The model 324 may be, for example, a function or a mapping based on characteristics of the engine 102. In this context, dilution refers to an amount of exhaust from a prior combustion event trapped within a cylinder for a combustion event. External dilution refers to exhaust provided for a combustion event via the EGR valve 170. Residual dilution (also referred to as internal dilution) refers to exhaust that remains in a cylinder or exhaust that is pushed back into the cylinder following the exhaust stroke of a combustion cycle.

Combustion phasing refers to a crankshaft position where a predetermined amount of fuel injected is combusted within a cylinder relative to a predetermined crankshaft position for combustion of the predetermined amount of injected fuel. For example, combustion phasing may be expressed in terms of CA50 relative to a predetermined CA50. CA50 refers to a crankshaft angle (CA) where 50 percent of a mass of injected fuel has been combusted within a cylinder. The predetermined CA50 corresponds to a CA50 where a maximum amount of work is produced from the fuel injected and is approximately 8.5-approximately 10 degrees after TDC (top dead center) in various implementations. While combustion phasing will be discussed in terms of CA50 values, another suitable parameter indicative of combustion phasing may be used. Additionally, while combustion quality will be discussed as coefficient of variation (COV) of indicated mean effective pressure (IMEP) values, another suitable parameter indicative of combustion quality may be used.

The ancillary inputs 328 provide parameters that are not directly affected by the throttle valve 112, the EGR valve 170, the turbocharger, the intake cam phaser 148 and the exhaust cam phaser 150. The ancillary inputs 328 may include engine speed, turbocharger inlet air pressure, IAT, or one or more other parameters. The feedback inputs 330 include, for example, an estimated torque output of the engine 102, an exhaust pressure downstream of the turbine 160A of the turbocharger, the IAT, an APC of the engine 102, an estimated residual dilution, an estimated external dilution, and other suitable parameters. The feedback inputs 330 may be measured using sensors (e.g., the IAT 192) or estimated based on one or more other parameters.

Each of the possible sequences identified by the sequence determination module 316 includes one sequence of N values for each of the target values 266 through 270. In other words, each possible sequence includes a sequence of N values for the target waste gate opening area 266, a sequence of N values for the target throttle opening area 267, a sequence of N values for the target EGR opening area 268, a sequence of N values for the target intake cam phaser angle 269, and a sequence of N values for the target exhaust cam phaser angle 270. Each of the N values are for a corresponding one of the N future control loops. N is an integer greater than or equal to one.

A cost module 332 determines a cost value for each of the possible sequences of the target values 266 through 270 based on the predicted parameters determined for a possible sequence and output reference values 356. An example cost determination is discussed further below.

A selection module 344 selects one of the possible sequences of the target values 266 through 270 based on the costs of the possible sequences, respectively. For example, the selection module 344 may select the one of the possible sequences having the lowest cost while satisfying actuator constraints 348 and output constraints 352.

Satisfaction of the actuator constraints 348 and the output constraints may be considered in the cost determination. In other words, the cost module 332 may determine the cost values further based on the actuator constraints 348 and the output constraints 352. As discussed in detail below, based on how the cost values are determined, the selection module 344 will select the one of the possible sequences that best achieves the base air torque request 208 while minimizing the APC, subject to the actuator constraints 348 and the output constraints 352.

The selection module 344 sets the target values 266 through 270 to the first ones of the N values of the selected possible sequence, respectively. In other words, the selection module 344 sets the target waste gate opening area 266 to the first one of the N values in the sequence of N values for the target waste gate opening area 266, sets the target throttle opening area 267 to the first one of the N values in the sequence of N values for the target throttle opening area 267, sets the target EGR opening area 268 to the first one of the N values in the sequence of N values for the target EGR opening area 268, sets the target intake cam phaser angle 269 to the first one of the N values in the sequence of N values for the target intake cam phaser angle 269, and sets the target exhaust cam phaser angle 270 to the first one of the N values in the sequence of N values for the target exhaust cam phaser angle 270.

During a next control loop, the MPC module 312 identifies possible sequences, generates the predicted parameters for the possible sequences, determines the cost of each of the possible sequences, selects one of the possible sequences, and sets of the target values 266 through 270 to the first set of the target values 266 through 270 in the selected possible sequence. This process continues for each control loop.

An actuator constraint module 360 sets an actuator constraints 348 for each of the target values 266 through 270. That is, the actuator constraint module 360 sets an actuator constraint for the throttle valve 112, an actuator constraint for the EGR valve 170, an actuator constraint for the waste gate 162, an actuator constraint for the intake cam phaser 148, and an actuator constraint for the exhaust cam phaser 150.

Referring now to FIGS. 2, 3 and 4A, 4B, 4C and 4D, the actuator constraint module 360 adjusts the actuator limits or constraints for a given actuator to follow a predetermined schedule that is dependent on operation conditions of the engine 102 such as speed, load and ambient conditions. Specifically, the actuator constraint module 360 adjusts the actuator constraints for the intake cam phaser 148 and the exhaust cam phaser 150 to follow a predetermined schedule that is dependent on engine speed, load and ambient humidity in order to constrain the amount of dilution in the combustion system or to maintain the combustion quality and thus performance of the engine 102 at an acceptable level. Accordingly, the actuator constraint module 360 receives the signal or output of the ambient humidity sensor 193 and utilizes it in conjunction with the three dimensional look up tables illustrated in FIGS. 4A, 4B, 4C and 4D to generate minimum and maximum actuator constraints for both the intake cam phaser 148 and the exhaust cam phaser 150. Alternatively, the ambient humidity may be estimated based upon, for example, current and past ambient conditions and operating parameters.

Figure 4A:
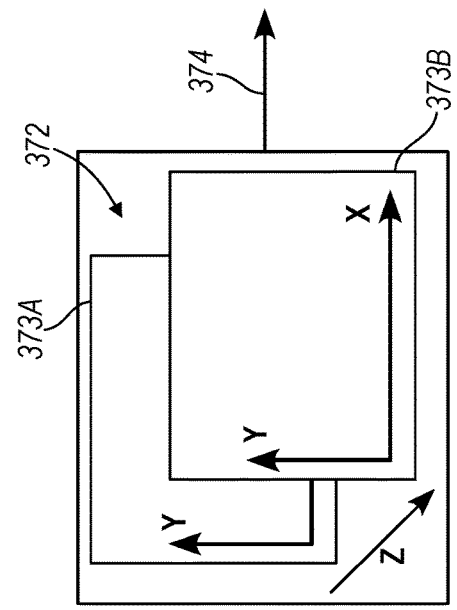
FIGS. 4A. 4B. 4C, and 4D are pictorial representations of three dimensional lookup tables utilized to provide minimum and maximum intake and exhaust camshaft phasing constraints according to the present disclosure.
Figure 4B:
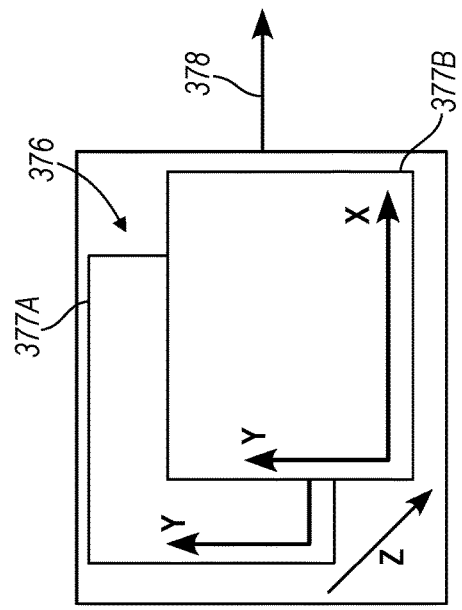

The three dimensional lookup table 372, illustrated in FIG. 4A, is utilized to generate a minimum target value for the intake cam phaser 148. It utilizes revolutions per minute of the engine 102 on the horizontal (X) axis, engine load on the vertical (Y) axis and ambient humidity on a diagonal (Z) axis. It will be understood that the Z axis is functionally perpendicular to the plane of the X and Y axes but is shown in FIG. 4A, as well as FIGS. 4B, 4C and 4D, diagonally due to the two dimensional constraints of the drawings. The X-Y plane 373A represents dry, minimum humidity and the X-Y plane 373B represents wet, minimum humidity. The lookup table 372 contains experimental and empirical values that, based upon the current values of the three variables, provide a specific, predetermined minimum value or target constraint 374 for the intake cam phaser 148. Likewise, the three dimensional lookup table 376, illustrated in FIG. 4B, utilizes revolutions per minute of the engine 102 on the horizontal (X) axis, engine load on the vertical (Y) axis and ambient humidity on a diagonal (Z) axis. The X-Y plane 377A represents dry, maximum humidity and the X-Y plane 377B represents wet, maximum humidity. The lookup table 376 contains experimental and empirical values that, based upon the current values of the three variables, provide a specific, predetermined maximum value or target constraint 378 for the intake cam phaser 148.

Figure 4C:
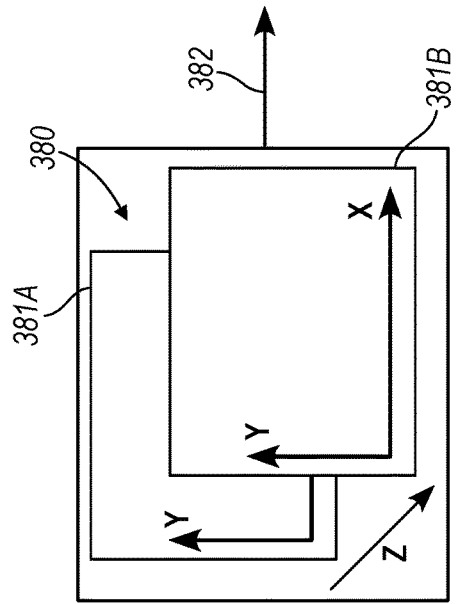
Figure 4D:
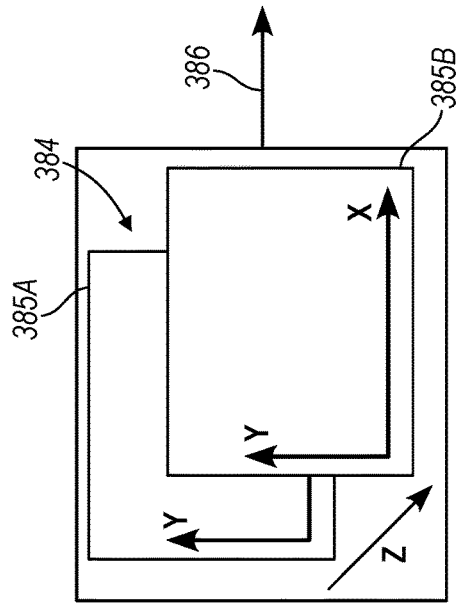

The three dimensional lookup table 380, illustrated in FIG. 4C, utilizes revolutions per minute of the engine 102 on the horizontal (X) axis, engine load on the vertical (Y) axis and ambient humidity on a diagonal (Z) axis. The X-Y plane 381A represents dry, minimum humidity and the X-Y plane 381B represents wet, minimum humidity. The lookup table 380 contains experimental and empirical values that, based upon the current values of the three variables, provide a specific, predetermined minimum value or target constraint 382 for the exhaust cam phaser 150. Likewise, the three dimensional lookup table 384, illustrated in FIG. 4D, utilizes revolutions per minute of the engine 102 on the horizontal (X) axis, engine load on the vertical (Y) axis and ambient humidity on a diagonal (Z) axis. The X-Y plane 385A represents dry, maximum humidity and the X-Y plane 385B represents wet, maximum humidity. The lookup table 384 contains experimental and empirical values that, based upon the current values of the three variables, provide a specific, predetermined maximum value or target constraint 386 for the exhaust cam phaser 150.

Figure 5:
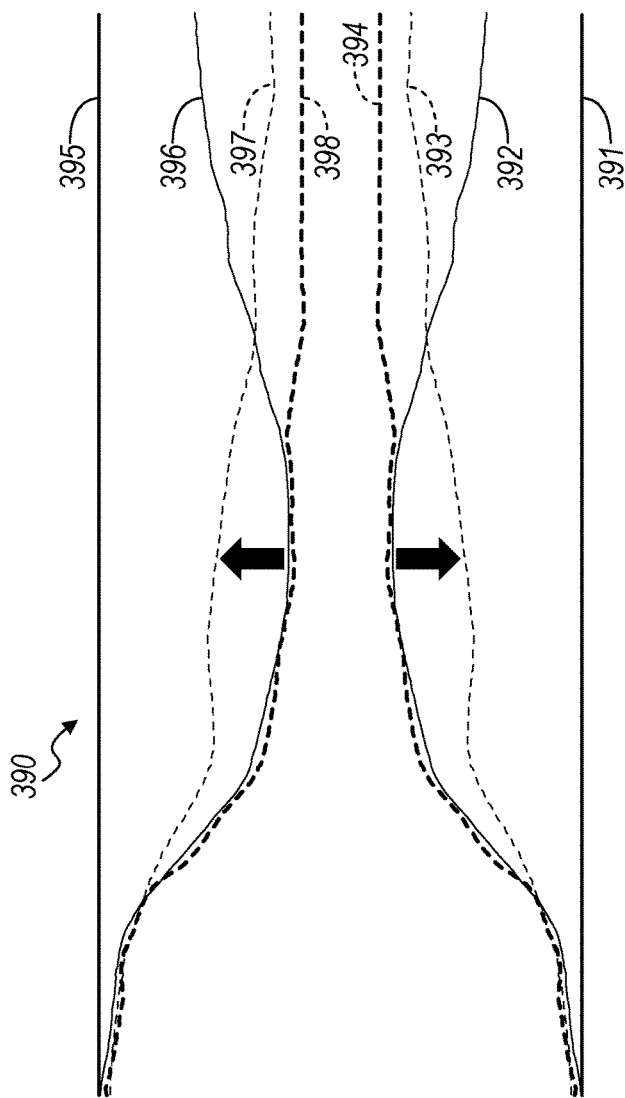
FIG. 5 is a time based graph illustrating the operation of the intake and exhaust camshaft phasing in accordance with the present disclosure.

Referring now briefly to FIG. 5, dynamic operation of the intake cam phaser 148 and the exhaust cam phaser 150 is illustrated in a graph 390 with ambient humidity varying over time being presented along the horizontal (X) axis. At the lower portion of the graph 390 are four traces presenting the intake cam phase value or position (ICPV). The lowermost line or trace 391 is flat and represents the ICPV maximum retard constraint generated or commanded by the actuator constraint module 360. At the right of the graph 390, the next higher line or trace 392 represents an ICPV reference constraint provided to the intake cam phaser 148 by the actuator constraint module 360 without compensation for humidity. At the right of the graph 390, the third line 393 represents the ICPV maximum cam advance constraint provided to the intake cam phaser 148 by the actuator constraint module 360 with high humidity. The uppermost line 394 on the graph 390 represents the ICPV maximum cam advance constraint provided to the intake cam phaser 148 by the actuator constraint module 360 with low humidity.

The upper portion of the graph 390 presents similar information regarding the exhaust cam phase value or position (ECPV). The uppermost line or trace 395 is flat and represents the ECPV maximum advance constraint generated or commanded by the actuator constraint module 360. At the right of the graph 390, the next lower line or trace 396 represents an ECPV reference constraint provided to the exhaust cam phaser 150 by the actuator constraint module 360 without compensation for humidity. At the right of the graph 390, the third line 397 represents the ECPV maximum cam retard constraint provided to the exhaust cam phaser 150 by the actuator constraint module 360 with high humidity. Finally, the line 398 on the graph 390 represents the ECPV maximum cam retard constraint provided to the exhaust cam phaser 150 by the actuator constraint module 360 with low humidity. It will be apparent from the lines or traces 391 through 398 of the graph 390 that optimum operation of the engine 102 requires less overlap between the closing of the exhaust valve(s) 130 and the opening of the intake valve(s) 122 with increasing humidity and vice versa.

Referring again to FIGS. 2 and 3, the actuator constraints 348 for the other target values 266, 267 and 268 may also include a maximum and minimum value for an associated target. Furthermore, the actuator constraint module 360 may adjust one or more of the actuator constraints 348 under certain circumstances. For example, the actuator constraint module 360 may adjust an actuator constraint to narrow the operational range for that actuator when a fault is diagnosed in that actuator circuit.

An output constraint module 364 sets the output constraints 352 for the predicted torque output of the engine 102, the predicted CA50, the predicted COV of IMEP, the predicted residual dilution, and the predicted external dilution. The output constraints 352 for each one of the predicted values may include a maximum value for an associated predicted parameter and a minimum value for that predicted parameter. For example, the output constraints 352 may include a minimum torque, a maximum torque, a minimum CA50 and a maximum CA50, a minimum COV of IMEP and a maximum COV of IMEP, a minimum residual dilution and a maximum residual dilution, and a minimum external dilution and a maximum external dilution.

The output constraint module 364 generally sets the output constraints 352 to predetermined ranges for the associated predicted parameters. However, the output constraint module 364 may vary one or more of the output constraints 352 under certain circumstances. For example, the output constraint module 364 may retard the maximum CA50, when knock occurs within the engine 102.

A reference module 368 generates the reference values 356 for setting each of the target values 266 through 270. Thus, the reference values 356 include a reference waste gate opening area, a reference throttle opening area, a reference EGR opening area, a reference intake cam phaser angle 269, and a reference exhaust cam phaser angle 270.

The reference module 368 determines the reference values 356 based on, for example, the air torque request 265, the base air torque request 308, or one or more other suitable parameters. The reference values 356 may be used to determine the cost values for possible sequences.

The MPC module 312 determines the target values 266 through 270 using a quadratic programming (QP) solver, such as a Dantzig QP solver. For example, the MPC module 312 may generate a surface of cost values for the possible sequences of the target values 266 through 270 and, based on the slope of the cost surface, identify a set of possible target values having the lowest cost. The MPC module 312 then tests that set of possible target values to determine whether that set of possible target values will satisfy the actuator constraints 348 and the output constraints 352. The MPC module 312 selects the set of possible target values having the lowest cost while satisfying the actuator constraints 348 and the output constraints 352.

The cost module 332 determines the cost for the possible sequences of the target values 266 through 270 based on relationships between: the predicted torque and the base air torque request 308; the predicted APC and zero; the possible target values and the respective actuator constraints 348; the other predicted parameters and the respective output constraints 352; and the possible target values and the respective reference values 356.

In operation, the MPC module 312 determines the cost values for the possible sequences. The MPC module 312 then selects the one of the possible sequences having the lowest cost. The MPC module 312 also determines whether the selected possible sequence satisfies the actuator constraints 348. If so, the possible sequence is utilized. If not, the MPC module 312 determines, based on the selected possible sequence, a possible sequence that satisfies the actuator constraints 348 and that has the lowest cost.

Figure 6:
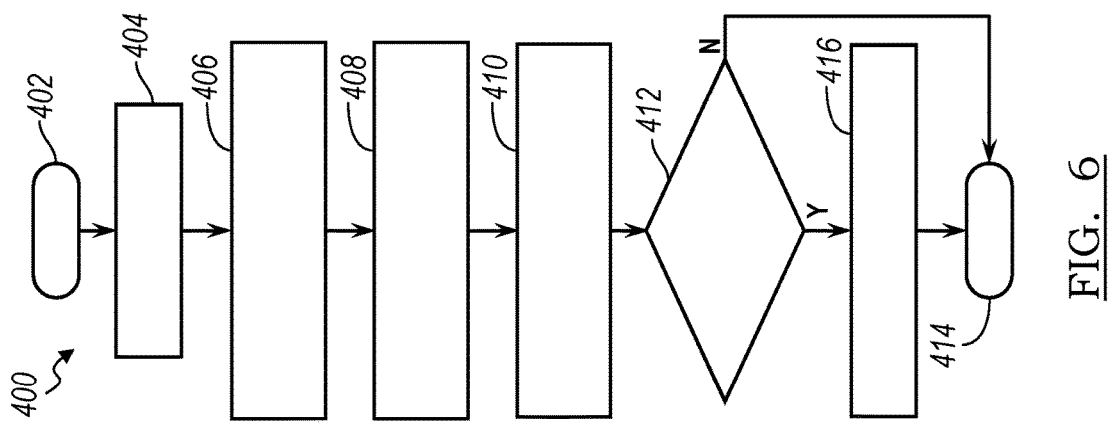
FIG. 6 is a flow chart presenting the steps of the method of controlling the phase of intake and exhaust camshaft phasing according to the present disclosure.

Referring now to FIG. 6, flow chart presenting the steps of the method of controlling the phase of the intake and exhaust camshaft phasers 148 and 150, respectively, is illustrated and generally designated by the number 400. The method 400 begins with a start or initializing step 402 that clears registers, if necessary, and commences an iteration of the steps of the method 400. Next, a process step 404 reads the signal from the intake air humidity sensor 192 or estimates the relative humidity. The method 400 then moves to a process step 406 in which the current speed of the engine 102 is read and the torque load of the engine 102 is determined from, for example, data from the torque requesting module 224. Next, the reference module 368 performs a process step 408 that determines the intake cam phase reference value and the exhaust cam reference value.

The actuator constraint module 360 performs a following process step 410 that utilizes the lookup tables 372, 376, 380 and 384 to determine the intake and exhaust cam phasers 148 and 150 minimum and maximum constraints for the current values of engine speed, load and humidity. A decision point 410 then inquires whether the reference values determined in step 408 are greater than the constraints determined in step 410. If the reference values are not greater than the constraints, the decision point 412 is exited at NO and the method 400 terminates at an end point 414. If the reference values are greater than the constraints, the decision point 412 is exited at YES and a process step 416 limits the reference values to the constraints determined in the step 410. The method 400 then terminates at the end point 414. In general, these minimum and maximum constraints allow less overlap of the intake and exhaust phasing with higher humidity and more overlap with lower humidity.

As utilized herein, the term module includes, but is not limited to, an Application Specific Integrated Circuit (ASIC); a digital, analog, or mixed analog/digital discrete circuit or integrated circuit; a combinational logic circuit; a field programmable gate array; a processor or microprocessor that executes code; memory that stores code executed by a processor; or other suitable hardware components that provide the described functionality.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of controlling intake and exhaust cam phase in an internal combustion engine, the method comprising:
sensing an engine speed and engine load of the internal combustion engine,
sensing relative humidity of air delivered to the internal combustion engine,
utilizing the engine speed, the engine load and the relative humidity in lookup tables to determine an intake cam phase maximum advance constraint value and an exhaust cam phase maximum retard constraint value, and
advancing the exhaust cam phase maximum retard constraint value and retarding the intake cam phase maximum advance constraint value as the sensed relative humidity increases.

2. The method of claim 1 further including sensing temperature of coolant in the internal combustion engine and adjusting the exhaust cam phase maximum retard constraint value and the intake cam phase maximum advance constraint value based upon the temperature of the coolant.

3. The method of claim 1 wherein the lookup tables are three dimensional.

4. The method of claim 1 further including retarding the exhaust cam phase maximum retard constraint value and advancing the intake cam phase maximum advance constraint value as the sensed relative humidity decreases.

5. The method of claim 1 wherein the engine load is based upon a torque request to an air control module.

6. The method of claim 1 wherein an intake cam phaser is coupled to and moves an intake camshaft and an exhaust cam phaser is coupled to and moves an exhaust camshaft.

7. A method of controlling intake and exhaust cam phase in an internal combustion engine based upon humidity, the method comprising:
sensing an engine speed and an engine load of the internal combustion engine,
sensing relative humidity of air delivered to the internal combustion engine,
utilizing the sensed engine speed, the sensed engine load and the sensed relative humidity in multi-dimensional lookup tables to determine a minimum intake cam phase constraint value and a maximum exhaust cam phase constraint value, and decreasing the maximum exhaust cam phase constraint value and increasing the minimum intake cam phase constraint value as the sensed relative humidity increases.

8. The method of claim 7 further including sensing coolant temperature in the internal combustion engine and adjusting the maximum exhaust cam phase constraint value and the minimum intake cam phase constraint value based upon the sensed coolant temperature.

9. The method of claim 7 further including increasing the maximum exhaust cam phase constraint value and decreasing the minimum intake cam phase constraint value as the sensed relative humidity decreases.

10. The method of claim 7 wherein the engine load is based upon a torque request to an air control module.

11. The method of claim 7 wherein an intake cam phaser is coupled to and moves an intake camshaft and an exhaust cam phaser is coupled to and moves an exhaust camshaft.

12. The method of claim 7 wherein an engine control module provides both reference values and constraining values to a phaser actuator module which controls intake and exhaust cam phasers.

13. A method of controlling intake and exhaust cam phase in an internal combustion engine, the method comprising:
   providing a torque demand signal based upon an operator input,
   sensing a speed of the internal combustion engine,
   establishing phase angle constraints of an intake cam phaser and phase angle constraints of an exhaust cam phaser based upon the torque demand signal and the engine speed,
   establishing relative humidity of ambient air provided to the internal combustion engine,
   utilizing lookup tables to advance the phase angle constraints of the exhaust cam phaser and retard the phase angle constraints of the intake cam phaser from the established phase angle constraints as the relative humidity increases and retard the phase angle constraints of the exhaust cam phaser and advance the phase angle constraints of the intake cam phaser from the established phase angle constraints as the relative humidity decreases.

14. The method of claim 13 wherein the relative humidity is established by one of estimation and sensing by a humidity sensor.

15. The method of claim 13 wherein the lookup tables include four multi-dimensional lookup tables, each lookup table including engine speed, engine load and relative humidity as variables.

16. The method of claim 13 wherein an overlap constraint between an opening of an intake valve and a closing of an exhaust valve of the internal combustion engine is adjusted based upon the established relative humidity.

* * * * *